March 10, 1953 W. H. PROBST 2,631,015
CONTINUOUS HELICAL LINER FOR VESSELS
Filed April 8, 1952

Inventor: Warren H. Probst
By Oswald H. Milmore
His Attorney

Patented Mar. 10, 1953

2,631,015

UNITED STATES PATENT OFFICE 2,631,015

CONTINUOUS HELICAL LINER FOR VESSELS

Warren H. Probst, Pasadena, Tex., assignor to Shell Development Company, Emeryville, Calif., a corporation of Delaware Application April 8, 1952, Serial No. 281,119

7 Claims. (Cl. 257—208)

This invention relates to the art of lining metal vessels, such as tanks, pressure vessels or kettles, chemical reactors, heat exchangers, pipes, etc., which are intended for use with aggressive fluids. More particularly the invention relates to a new method of mounting lining material within a vessel to protect the walls thereof from attack by fluids and/or to form a flow space for the circulation of a thermal fluid for heating or cooling the contents of the vessel. The invention further relates to an improved arrangement of the lining. This application is a continuation-in-part of my copending application Serial No. 207,926, filed January 26, 1951.

Vessels having walls in contact with aggressive media are frequently applied in chemical engineering, for example, as vessels in which chemical reaction takes place between liquids and/or gases at elevated temperatures and/or pressures. Considerations of strength or economy or both necessitate that such vessels be constructed with an outer body or shell made of a base metal such as iron or steel that is internally covered with a corrosion-resistant lining, the composition of which is selected in accordance with the intended service and may, for example, be an alloy such as aluminum-bronze, chrome-nickel, etc.

Various arrangements for securing such linings have been proposed. (See for example, an article "New techniques for lining vessels for protection against corrosion" by G. C. Carpenter in Petroleum Processing, January 1950, pp. 21–24.) Linings that are attached by overlapping successive portions somewhat resembling shingles have certain advantages. In the common shingle-type linings narrow liners are set circumferentially inside the vessel to be lined and are set at right angles to the longitudinal axis of the vessel. One edge of the liner strip is welded to the vessel wall, and the second edge, parallel to the first, overlaps the edge of the adjacent liner strip; a weld is then made between the second edge and the underlying liner strip. Thus, when the lining is completed only the interior liner welds are exposed and these join liner material to liner material and may be made of weld metal of the same composition as or metallurgically similar to the liner; all welds of liner material to the vessel wall are covered by the lining.

One disadvantage of the common shingle-type linings is that longitudinal butt welds must be provided to connect the ends of the narrow liners; this is true when the liners extend through only a part of the circumference of the vessel as well as when circumferentially longer liners are used. These longitudinal welds must be made while the liner strip is in contact with the vessel wall, and hence some pickup of iron from the steel vessel is inevitable in these longitudinal welds. A further disadvantage is the need to cut and fit a large number of lining strips to fit about the inner circumference of the vessel, resulting in a waste of lining material and expenditure of labor.

A further drawback with prior lining devices has been the difficulty of detecting leaks in the lining and of counteracting such leaks while the vessel is in use. It is desirable to provide a telltale hole through the wall of the vessel or pressure shell to communicate at one end with the space between the wall and the lining and at the other end with a suitable indicating instrument wherein the discharge of fluid through the hole or build-up of pressure in the said space can be detected. When numerous narrow liners are used in accordance with the prior practice, it is necessary to use many such holes, one behind each liner, and this, in turn, requires a complex manifold system.

A further drawback with prior lining devices has been the lack of a satisfactory method of maintaining the open space behind the liner free from deposits of corrosion products, polymerization products, products of reaction, etc. In the common type liner when the gap behind the lined plate became plugged, the flow through the tell-tale hole was reduced or stopped completely. A further disadvantage, from a safety viewpoint, has been that process combustible mixtures, when used as a back pressure media, could not be effectively purged from behind the liner prior to making welding repairs.

Analogous problems have arisen when jackets for the circulation of a thermal fluid for heating or cooling the contents of the vessel are provided. It has been necessary to make a compromise between the use of thick walls between the inside of the vessel and the jacket space on the one hand and thick walls on the other. The former leads to poor heat transmission and is expensive when special alloys that are resistant against aggressive media are used. Heat transmission is especially poor when the jacket surrounds a wall that is lined on the inside with a protective wall according to the prior art. The latter choice has, heretofore, led to difficulties in providing adequate structural support for the thin wall, particularly when the vessel is operated under pressure.

It is an object of this invention to provide an improved method of securing linings in vessels and an improved construction of the lining whereby the need for longitudinal welds that are made in contact with the vessel is eliminated; whereby the use of a continuous strip of lining material of any length is made possible, thereby obviating the need for cutting the lining into many pieces of exact lengths; to arrange the lining material so that one or more flow channels or passageways are formed between the lining and the outer wall of the vessel suitable for the circulation of a thermal fluid and/or an inert fluid suitable for temporarily counter-acting the effects of small leaks and for indicating the occurrence of such leaks; and to arrange the passages so that one or a relatively small number of tell-tale holes suffice for the detection of leaks.

In summary, according to this invention, the lining is formed of a continuous strip (which may consist of several strips that are butt-welded end to end independently of the vessel wall) coiled helically against the inside surface of the vessel with partly overlapping turns, welded continuously to the previous turn at the exposed edge, and welded to the vessel wall at the unexposed edge, either by spot welding or by continuous welding. As a result of this arrangement, there is a continuous helical space or passageway between the lining and the vessel wall, whereby all parts of the helical space or passageway, over the entire area of the covered vessel wall can be placed into flow communication with the same tell-tale hole through the vessel wall. Any number of such tell-tale holes may be provided in the wall, thereby permitting realization of the added advantage that, by opening the proper combination of tell-tales, the helical passageway can be purged with an inert gas or stem or cleaned out by backwashing with a suitable solvent. A terminal fluid may be circulated through the helical passageway or through any selected part thereof for heating or cooling the contents of the vessel.

The invention will be further described with reference to the accompanying drawings forming a part of this specification and illustrating one preferred embodiment, wherein.

Figures 1, 2, 3:
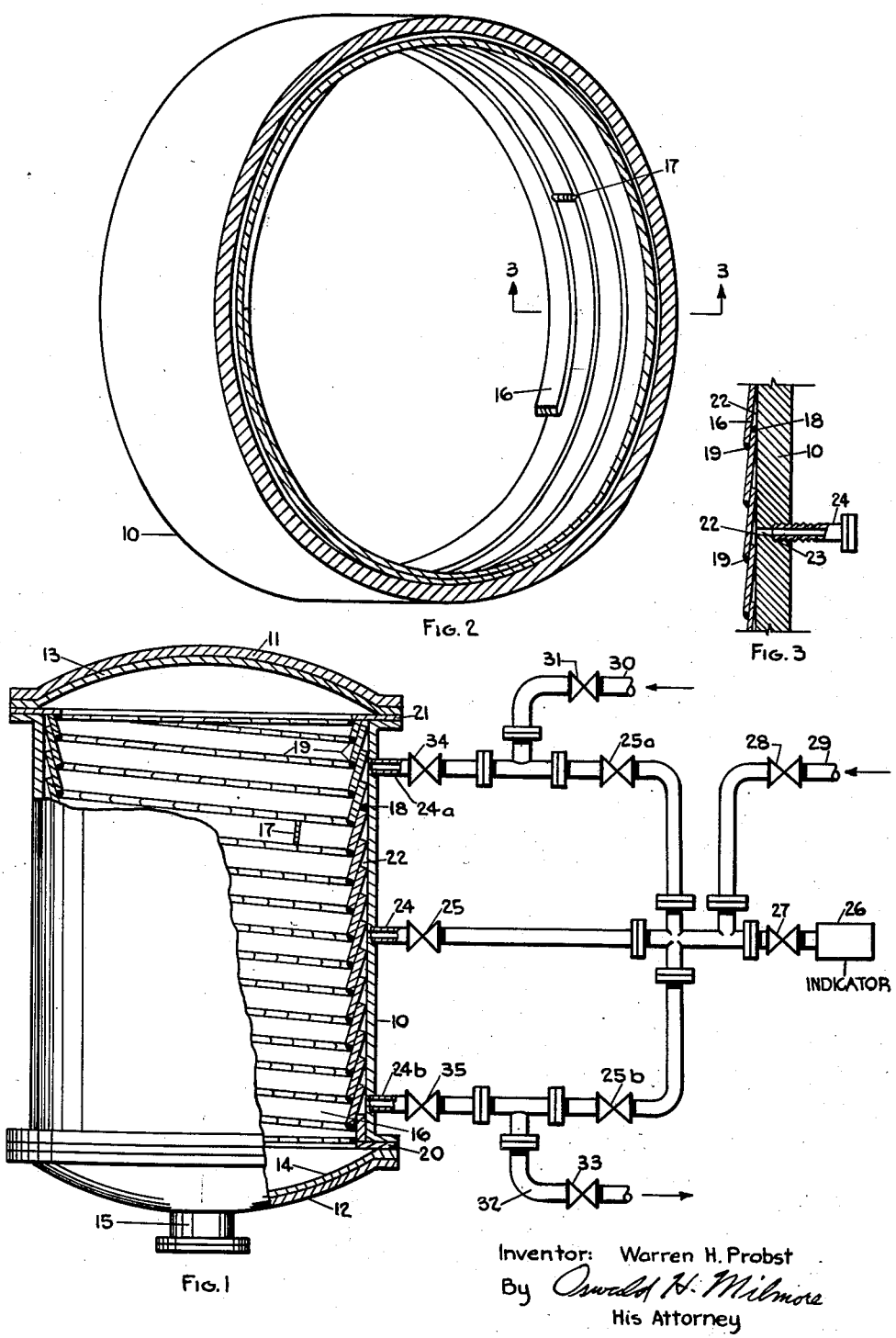
Fig. 1 is a vertical section view of a vessel lined in accordance with the invention, part being shown in elevation.
Fig. 2 is a perspective of a section of the vessel during the process of placing the lining, part of the lining band being cut away and the continuous welds being omitted for clarity.
Fig. 3 is an enlarged section showing the welded lining, taken on line 3—3 of Fig. 2.

Referring to the drawings in detail, Fig. 1 shows a vessel, such as a pressure vessel having an outer peripheral shell 10 which may have a cylindrical shape and be formed of a large steel tube or built up of a number of steel plates that are suitably welded or riveted together so as to provide a relatively continuous inner surface suitable for welding. The shell has top and bottom closures 11 and 12 lined with corrosion-resistant linings 13 and 14. Suitable conduits, such as the conduit 15, may be fitted to one or both of these closures. The specific arrangement of the closures, their linings and conduits forms no part of the invention.

The novel lining comprises a continuous strip or band of corrosion-resistant metal 16, e. g., one made of metal alloy resistant to the fluids to be handled in the vessel, that is laid helically in a plurality of overlapping turns, starting at one end of the shell, e. g., at the bottom as shown in Fig. 1. Such lining material may be supplied on drums in long pieces sufficient to make many turns about the pressure shell; when the length is insufficient for this purpose two or more pieces may be butt-welded as shown at 17, either prior to introducing the lining into the shell or after such introduction, precaution being preferably taken in the latter case to isolate or otherwise protect the liner from the shell to prevent pickup of iron from the shell wall.

In placing the lining, the band or lining strip is laid against the inner face of the shell with a slight pitch so that the free end of the strip extends toward the starting end of the shell (toward the bottom, in the embodiment shown, wherein the lining is started at the bottom and wound towards the top) and one edge of the band, extends beyond the end of the shell entirely around the shell to leave a gradually widening overhanging part that, when laid flat, would have a substantially triangular outline. The other edge of the band, which is away from the starting end of the shell is herein referred to as the leading or covered edge; it is laid continuously directly against the inner face of the shell wall or base and welded thereto continuously or at intervals by any suitable technique, e. g., by fillet welds as shown at 18, before it is covered by the next turn of the band. Since the leading edge is covered by each successive turn the operations of welding and laying successive helical turns of the band are performed contemporaneously, e. g., simultaneously or alternately by laying one turn or a fraction thereof and then welding it before resuming the laying. The pitch is selected to cause each turn of the band to overlap the previous turn by a suitable distance, e. g., one-half to three-quarters of an inch, and each new turn is welded continuously to the previous weld, preferably by a fillet weld as indicated at 19, although an autogeneous weld may in certain cases be employed. This weld may be made contemporaneously with the laying or when the lining has been fully laid. It is advantageous to use corrosion-resistant weld metal, e. g., metal that is metallurgically similar to, or has about the same composition as the alloy used in the lining. The upper edge of the band is thus covered by each successive helical turn throughout the length of the vessel, except for the last turn which extends beyond the end of the shell. When the lining has been welded the more or less triangular-shaped overhanging parts at the ends of the shell are trimmed. According to a variant, the band at the starting end may be trimmed before applying it to the shell. The lined heads 11 and 12 may be attached to the lined shell in any suitable manner. For example, annular sheets of the same corrosion-resistant material, shown at 20 and 21, may be welded to the trimmed ends of the helical lining to extend the lining over the ends of the shell 10, where it is engaged by the linings 13 and 14 of the end closures; however, the invention is not limited to this particular arrangement.

It will be noted that a space 22 is formed between the shell wall and the under side of the helical lining; this space forms a continuous, helical passageway extending the full length of the pressure shell. One or more holes 23 are cut through the pressure shell. These holes may be small weep holes or tell-tale holes when the space 22 is to be used only for a pressure fluid to detect leaks or to counter-act leaks; however, larger holes may be desirable when the space is to be used for the circulation of a thermal fluid. Considering first the use of the spaces for the former purpose, the hole 23 is connected to a pipe 24 which is, in turn, connected through an optional valve 25 to an indicating instrument 26 of any suitable type, such as a flow indicator, a pressure gauge, etc., which may be isolated by a valve 27. Pipe 24 is further connected by a normally closed valve 28 to a supply conduit 29 that is connected to a source of non-corrosive pressure fluid, not shown. During operation, valves 25 and 27 are open, and valve 28 may be closed. In the event that a leakage opening occurs in the helical lining, and assuming that the pressure vessel exceeds that maintained in the helical passageway 22 and the associated pipes, fluid from the interior of the vessel flows through such opening into the helical passageway and displaces naturally occurring or special inert fluid therein through the hole 23 and pipe 24 to give an indication in the indicating instrument 26. To counter-act the leakage, pressure fluid may then be supplied by opening valve 28; the valve 27 may, if desired, be then closed. This fluid may be admitted at a pressure in excess of that of the fluid contents of the vessel, so as to enter the vessel through the leakage opening and thereby prevent additional amounts of corrosive fluid from flowing outwardly through the opening. The pressure fluid may be any inert fluid; it is advantageous to use as the pressure fluid one of the reactants or a diluent that is already present in the vessel, so as not to contaminate the contents of the vessel, the non-corrosive or least corrosive reactant being of course selected for this purpose. It is thereby possible to maintain the vessel in operation for some time after a failure of the lining occurs. It is also possible to operate the device by maintaining in the passageway 22 and the associated pipes leading to the indicator a pressure that is higher than that of the contents of the vessel and to detect the occurrence of a leak by a drop in pressure as shown by the indicator 26.

According to a further variant, I may omit the indicating instrument 26 and maintain non-corrosive fluid under pressure from the conduit 29 behind the lining at all times that the vessel is in operation by keeping the valve 28 open. Although a single tell-tale hole is theoretically sufficient, it may be desirable to provide a few additional holes, particularly in larger vessels, to guard against the possibility that the passageway 22 may become clogged by the flow of reacting mixture or by reaction e. g., polymerization, of the non-corrosive fluid. Thus, additional tell-tale holes may be provided at the upper and lower ends of the liner and connected to the pipe 24 through pipes 24a and 24b, respectively, shown in Fig. 1; valves 25a and 25b permit isolation of these tell-tales. A supply conduit 30 is connected to pipe 24a through a valve 31, and a discharge conduit 32 is connected to the pipe 24b through a valve 33. Normally open valves 34 and 35 are placed in the conduits 24a and 24b. During normal operation of the vessel, the valves 31 and 33 are closed and at least one of the valves 25, 25a and 25b, or all of them are open to indicate a pressure build-up in the instrument 26 or to feed pressure fluid from the conduit 29. To purge the helical passageway 22 the valves 25, 25a and 25b are closed, valves 31 and 33 are opened, and purge fluid is forced under pressure from the conduit 30 through the entire helical passageway to the conduit 32, thereby restoring the access opening behind the liner to its original condition. It is evident that the sections of the helical passageway can be purged one at a time. Thus, by closing valves 27 and 35 and opening valves 25 and 25b the purge fluid enters the passageway through the pipe 24a and discharges through 24 and the upper half of the passageway is purged; subsequently the lower half is purged by closing valves 25b and 34 and opening valves 25a and 35.

When the helical channel is to be used for the circulation of a thermal fluid, valves 31, 34, 35 and 33 are kept open during the operation of the vessel and all other valves may be kept closed or the pipes associated with such other valves may be omitted. A thermal fluid is then circulated, either downwardly from the pipe 30, through the space 22 and out through the pipe 32, or in the opposite direction. It is evident that by means of the valves 25a, 25b and the pipe 24, and by opening the valve 25, the thermal fluid may be circulated through only a part of the helical space.

The width of the protective metal band may be varied within wide limits without departing from the scope of the invention. It is preferred to use metal strips of limited widths so that the pitch angle is between about 0.5° and 5°, i. e., using bands having widths between about one-twentieth and one-fourth of the diameter of the vessel, the narrower widths being preferred particularly when relatively thick lining metal is used.

I claim as my invention:

1. A metallic vessel having a lining formed of a single continuous band of protective metal laid helically against the inner surface of the vessel in a plurality of partly overlapping turns whereby the overlapping edge of said band is continuously exposed and the other edge is continuously covered, said covered edge being welded to the vessel and the exposed edge being welded continuously to the overlapped turn of the same band.

2. A lined vessel according to claim 1 wherein the lining has a width between about one-twentieth and one-fourth of the diameter of the vessel.

3. A lined vessel according to claim 1 wherein the exposed edge is fillet welded.

4. A lined vessel according to claim 3 wherein the fillet weld contains weld metal that is non-corrosive and is metallurgically similar to the protective metal.

5. A metallic vessel having a lining formed of a single, continuous band of protective metal laid helically against the inner surface of the vessel in a plurality of partly overlapping turns wherein the overlapping edge of said band is continuously exposed and the other edge is continuously covered, said covered edge being welded to the vessel and the exposed edge being welded continuously to the overlapped turn of the same band, said lining being spaced from the vessel wall at said covered edge to leave a continuous, helical passageway, and a hole through the wall of the vessel communicating with said helical passageway to afford communication to the space between the vessel wall and the lining.

6. A lined vessel according to claim 5 wherein the vessel wall is provided with at least two holes communicating with points spaced along said helical passageway, and conduit means connected to said tell-tale holes for admission of a fluid through one of said holes and the discharge of said fluid through the other of said holes after flow through the intervening part of the passageway.

7. A lined vessel according to claim 5 wherein the said two holes are located substantially at the ends of said helical passageway, whereby the fluid can flow through the entire passageway.

WARREN H. PROBST.

No references cited.